(12) United States Patent
Gianfranceschi

(10) Patent No.: US 10,900,528 B2
(45) Date of Patent: Jan. 26, 2021

(54) NO-BACK/TORQUE LIMITER DEVICE WITH TORQUE SENSING ELEMENTS

(71) Applicant: Microtecnica S.r.l., Turin (IT)

(72) Inventor: Marco Gianfranceschi, Turin (IT)

(73) Assignee: MICROTECNICA S.R.L., Turin (IT)

( * ) Notice: Subject to any disclaimer, the term of this patent is extended or adjusted under 35 U.S.C. 154(b) by 211 days.

(21) Appl. No.: 16/116,974

(22) Filed: Aug. 30, 2018

(65) Prior Publication Data

US 2019/0063520 A1  Feb. 28, 2019

(30) Foreign Application Priority Data

Aug. 30, 2017  (EP) .................................... 17188634

(51) Int. Cl.
| | | |
|---|---|---|
| *F16D 3/72* | (2006.01) | |
| *F16D 59/02* | (2006.01) | |
| *B64C 13/28* | (2006.01) | |
| *F16D 55/38* | (2006.01) | |
| *F16D 59/00* | (2006.01) | |
| *F16D 7/02* | (2006.01) | |
| *F16D 43/02* | (2006.01) | |
| *F16D 125/36* | (2012.01) | |
| *F16D 47/02* | (2006.01) | |

(Continued)

(52) U.S. Cl.
CPC .............. *F16D 59/02* (2013.01); *B64C 13/28* (2013.01); *F16D 7/022* (2013.01); *F16D 43/02* (2013.01); *F16D 55/38* (2013.01); *F16D 59/00* (2013.01); *F16D 3/10* (2013.01); *F16D 3/72* (2013.01); *F16D 47/02* (2013.01); *F16D 51/04* (2013.01); *F16D 2125/36* (2013.01); *F16D 2127/005* (2013.01); *F16H 2035/005* (2013.01)

(58) Field of Classification Search
CPC .......... F16D 59/02; F16D 59/00; F16D 7/022; F16D 43/02; F16D 55/38; F16D 47/02; F16D 2127/005; F16D 51/04; F16D 3/72; F16D 3/10; F16D 2125/36; F16D 7/005; F16H 2035/005; B64C 13/28
See application file for complete search history.

(56) References Cited

U.S. PATENT DOCUMENTS 2,946,417 A * 7/1960 Hungerford, Jr. ........ F16B 1/04
192/223.4
3,329,242 A * 7/1967 Minarick ................ F16D 59/00
188/134

(Continued)

FOREIGN PATENT DOCUMENTS

GB       1246180 A    9/1971

OTHER PUBLICATIONS

Extended European Search Report for International Application No. 17188634.4 dated Mar. 19, 2018, 7 pages.

*Primary Examiner* — David J Hlavka
(74) *Attorney, Agent, or Firm* — Cantor Colburn LLP

(57) ABSTRACT

A torque limiter and no-back assembly comprises an input shaft, an output shaft, a torque limiter provided between the input shaft and the output shaft, the torque limiter comprising a torque sensing element; and a no-back device arranged to brake the output shaft when the torque sensing element senses levels of torque above a threshold level between the input shaft and the output shaft, characterised in that the torque sensing element comprises a torsion spring having ends which are coupled to the input shaft and the output shaft for rotation therewith.

20 Claims, 7 Drawing Sheets

(51) Int. Cl.
    *F16D 127/00*     (2012.01)
    *F16D 51/04*     (2006.01)
    *F16H 35/00*     (2006.01)
    *F16D 3/10*     (2006.01)

(56) References Cited

U.S. PATENT DOCUMENTS

| | | | | |
|---|---|---|---|---|
| 3,659,682 A | * | 5/1972 | Meyer | F16D 49/02 |
| | | | | 188/134 |
| 3,726,370 A | * | 4/1973 | Hubbard, Jr. | F16B 1/04 |
| | | | | 192/223.4 |
| 3,734,253 A | * | 5/1973 | Derossi | F16D 7/022 |
| | | | | 192/223.4 |
| 4,483,429 A | | 11/1984 | Tiedeman | |
| 4,526,047 A | * | 7/1985 | Yang | F41A 25/10 |
| | | | | 188/129 |
| 4,579,201 A | | 4/1986 | Tiedeman | |
| 5,655,636 A | | 8/1997 | Lang et al. | |
| 5,944,148 A | * | 8/1999 | Bae | B64C 13/34 |
| | | | | 188/134 |
| 6,666,307 B1 | | 12/2003 | Christensen | |
| 7,143,888 B2 | | 12/2006 | Lang | |
| 9,616,990 B2 | | 4/2017 | Barger | |
| 2006/0163026 A1 | | 7/2006 | Lang | |

\* cited by examiner

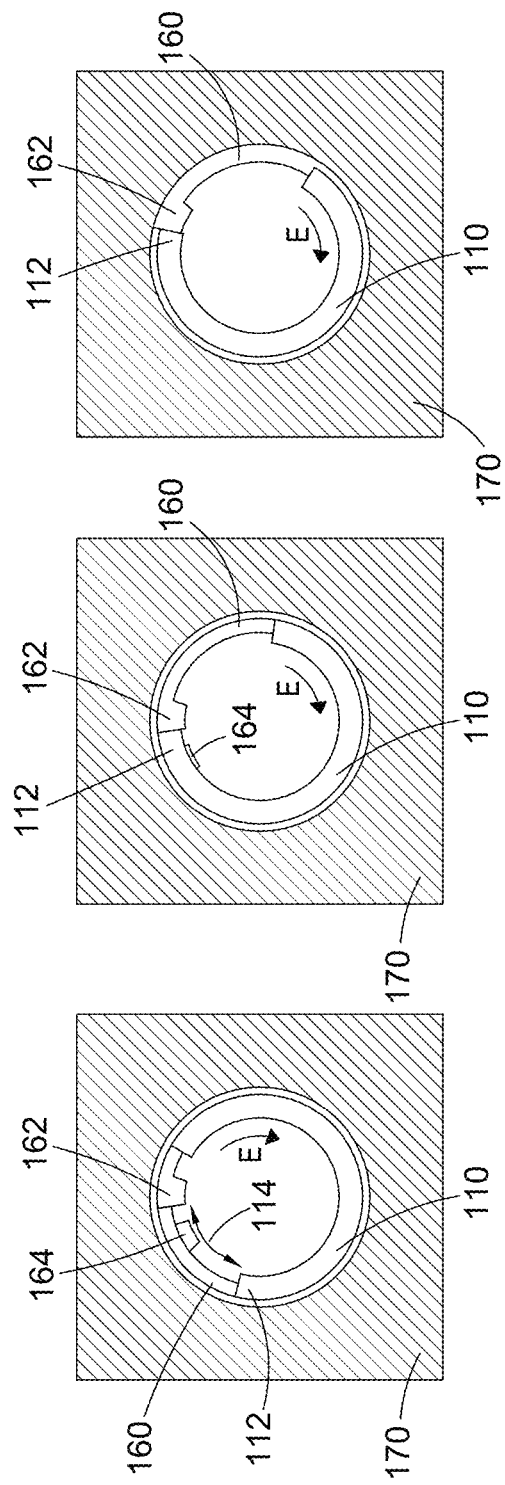

NO-BACK/TORQUE LIMITER DEVICE WITH TORQUE SENSING ELEMENTS

FOREIGN PRIORITY

This application claims priority to European Patent Application No. 17188634.4 filed Aug. 30, 2017, the entire contents of which is incorporated herein by reference.

FIELD OF THE DISCLOSURE

The present disclosure relates to the field of torque limiter and no-back assemblies, for example, for use in actuators, such as linear or rotating mechanical actuators.

BACKGROUND

Actuation systems, such as those used in aircraft, contain actuators which include torque limiters and no-back assemblies. The actuation systems transfer torque from an input shaft to an output shaft in order to actuate moveable components, such as flaps or slats on aircraft wings, for example. Torque limiters are provided in the torque path to ground excessive torque to prevent it damaging components. No-back devices are used in conjunction with a torque limiter to prevent undesired movements caused by external loads on the actuator.

The no-back devices provided in such actuators act to prevent an external torque applied to the output shaft (e.g. from external forces such as airload acting on a flap or slat) from being transferred back to the input shaft. This is important if, for example, a disconnection failure occurs in the actuation system, as the no-back device can prevent a loss of position control of a component (e.g. flap or slat) by grounding any resultant torque acting on the component (e.g. an airload) to a structural ground and thereby locking the component in a fixed position.

The torque limiters provided in such actuators act to prevent excessive torque (mechanical overload, e.g. from a structural jam) from the input shaft being transmitted to the output shaft and other components (e.g. flaps or slats), which could potentially damage them. Torque limiters may limit the torque in various ways.

In some cases, both the no-back and the torque-limiting functions are provided in a single assembly (e.g. in the so-called "torque limiting/no-back" assembly).

One way in which a no-back/torque limiter assembly can work is disclosed in U.S. Pat. No. 4,579,201, which describes a torque limiter and brake mechanism. The torque limiter part comprises ball bearings positioned between a drive cam and a collar. The drive cam and collar are urged together by a number of Belleville spring washers acting as an axial spring. The torque limit is set by setting the spring force acting on the ball bearings. The torque limiter is surrounded by a no-back device in the form of a spring which can expand within a housing until it hits the inner wall of the housing. At this point, it can expand no further and causes a braking action.

Another known system comprises a torque sensing element in the form of a sliding collar provided between the input shaft and the output shaft, which is caused to disengage the output shaft when a threshold level of torque ("activation threshold") is reached. The collar has a helical surface for engagement with a helical surface on the output shaft, the mating helical surfaces being held together under the action of an axial spring bias. Under normal loadings, the torque is transferred between the input shaft and the output shaft through engagement of the helical surfaces; however, when the torque limiter is subjected to larger loadings, the torque limiter is "activated" (i.e., it disengages), allowing the input shaft to rotate further relative to the output shaft. In so doing, an end of a no-back spring is drawn into engagement with a tooth on the input shaft. This transfers torque through the no-back spring, causing the no-back spring to expand and ground the torque inside the actuator. This solution has shown good performances in service in the last 40 years but since it relies on friction, it is dependent on the quality of the parts, surface finishing and operating temperature.

An issue with torque limiters is the correct setting of their activation torque, such to duly protect the downstream parts of the actuator from overloads, while preventing nuisance activations under normal operating conditions. The torque limiter setting must then take into account the possible variations of efficiency and drag torques of the internal parts of the actuator. On top of that, load/torque rate on the output could have an influence on the torque limiter trip value at different temperatures. This causes the difference between the minimum and maximum torque limiter activation thresholds to be quite high and the actuator design must take that variation in threshold into account for sizing all its internal components.

Since the apparatus will need to be able to withstand a range of torque limits based on variations in friction, the design of the apparatus will need to include larger parts which can withstand the applied torques at the higher end of the expected range (when friction between the surfaces is at a maximum) which can come with an undesirable weight penalty.

SUMMARY

According to a first aspect of the disclosure, there is provided a torque limiter and no-back assembly comprising: an input shaft; an output shaft; a torque limiter provided between the input shaft and the output shaft, the torque limiter comprising a torque sensing element; and a no-back device arranged to brake the output shaft when the torque sensing element senses levels of torque above a threshold level between the input shaft and the output shaft, wherein the torque sensing element comprises a torsion spring having ends which are coupled to the input shaft and the output shaft for rotation therewith.

The torque sensing element may sense torque by undergoing torsion, the torsion in the torque sensing element allowing a predetermined amount of relative rotation between the input shaft and the output shaft prior to activation of the no-back device to brake the output shaft.

The torque sensing element may also be arranged to transmit torque between the input shaft and the output shaft through a displaceable torque coupling allowing axial movement of one end of the torque sensing element. Optionally, the displaceable torque coupling may be positioned between the torque sensing element and the output shaft.

The torque limiter may comprise at least one support at one or each end for coupling rotation from the input shaft and the output shaft into a respective end of the torque sensing element.

The no-back device may be provided between the input shaft and the output shaft in parallel with the torque limiter, the no-back device being arranged to activate a brake to ground torque to a housing if torque has exceeded the threshold level.

The no-back device may comprise a no-back spring arranged within a housing, the no-back spring being a torsion spring which expands radially under torque to engage a seat provided by the housing. Optionally, the no-back spring may have the same winding direction as the torque sensing element. Further optionally, with or without this feature, the torque sensing element may extend within the no-back spring.

The no-back spring comprises ends, one of which is allowed to rotate relative to one of the input shaft or the output shaft when torque is below the threshold level and not being transmitted by the no-back spring. The other end of the no-back spring may be fixed to the output shaft by mechanical engagement with a feature. In one embodiment, the feature may be a groove.

The torque limiter may comprise input surfaces at one or both of the input shaft and/or the output shaft to couple torque into the no-back device, wherein one or more of the input surfaces may be rotationally spaced from an adjacent end of the no-back spring when torque is absent from the assembly. Optionally, the torque input surfaces may comprise teeth which engage the ends of the no-back spring, and both ends of the no-back spring may be arranged to be in engagement with respective adjacent teeth once a predetermined amount of relative rotation has occurred between the input shaft and the output shaft.

The torque sensing element is normally stiffer under torsion than the no-back spring, and optionally the torque sensing element may comprise a smaller number of coils than the no-back spring, and/or may comprise a torsion spring having thicker coils, and/or may be formed from a material having a greater modulus of elasticity than the no-back spring.

The assembly may comprise a second torque sensing element arranged on an opposite end of the output shaft to sense torque in an opposite direction of rotation to the other, first torque sensing element.

The assembly may comprise a second no-back device which is arranged to brake the output shaft when the second torque sensing element senses levels of torque above a threshold level between the input shaft and the output shaft in the opposite direction. Optionally, the second no-back device may comprise a second no-back spring arranged within a second housing, the second no-back spring being a torsion spring which expands radially under torque to engage a seat provided by the second housing. Optionally, the second no-back spring may have the same winding direction as the second torque sensing element, and/or the second torque sensing element may extend within the second no-back spring.

The output shaft may comprise a worm gear for engagement with an actuator, the worm gear being located between the two torque sensing elements and between the two no-back springs.

According to a second aspect of the disclosure, there is provided an actuator for a flight control surface comprising a torque limiter and no-back assembly of any embodiment of the first aspect (e.g., a torque limiter and no-back assembly as described in any of, or combination of, the above-mentioned statements).

According to a third aspect of the disclosure, there is provided a method of sensing torque in a torque limiter and no-back assembly, the assembly comprising an input shaft, an output shaft, a torque limiter provided between the input shaft and the output shaft, the torque limiter comprising a torque sensing element, and a no-back device arranged to brake the output shaft when the torque sensing element senses levels of torque above a threshold level between the input shaft and the output shaft. The method comprises using a torsion spring for the torque sensing element which has ends coupled to the input shaft and the output shaft for rotation therewith, such that torque is sensed through torsion of the torque sensing element.

The torsion in the torque sensing element may allow a predetermined amount of relative rotation between the input shaft and the output shaft prior to activating the no-back device to brake the output shaft.

The assembly may comprise a second torque sensing element in the form of a second torsion spring arranged on an opposite end of the output shaft, the second torsion spring being arranged to sense torque in an opposite direction to the first torque sensing element. Optionally, the first torque sensing element may activate the no-back device to brake the output shaft when torque exceeds a first threshold level in one of a clockwise and an anticlockwise direction, and the second torque sensing element may activate a second no-back device to brake the output shaft when torque exceeds a second threshold level for the second torque sensing element in the other of the clockwise and anticlockwise directions. Optionally the first and second threshold levels may be different.

BRIEF DESCRIPTION OF THE DRAWINGS

Certain embodiments of the disclosure will now be described by way of example only and with reference to the accompanying drawings, in which:

FIG. 7A schematically depicts a partial cross-section through a torque limiter and no-back assembly, taken along the line 7-7 in FIG. 6, showing the position of the input shaft and no-back spring below a threshold level of torque;

FIG. 7B shows the depiction of FIG. 7A at the threshold level of torque; and FIG. 7C shows the depiction of FIG. 7A above the threshold level of torque.

DETAILED DESCRIPTION

Figure 1:
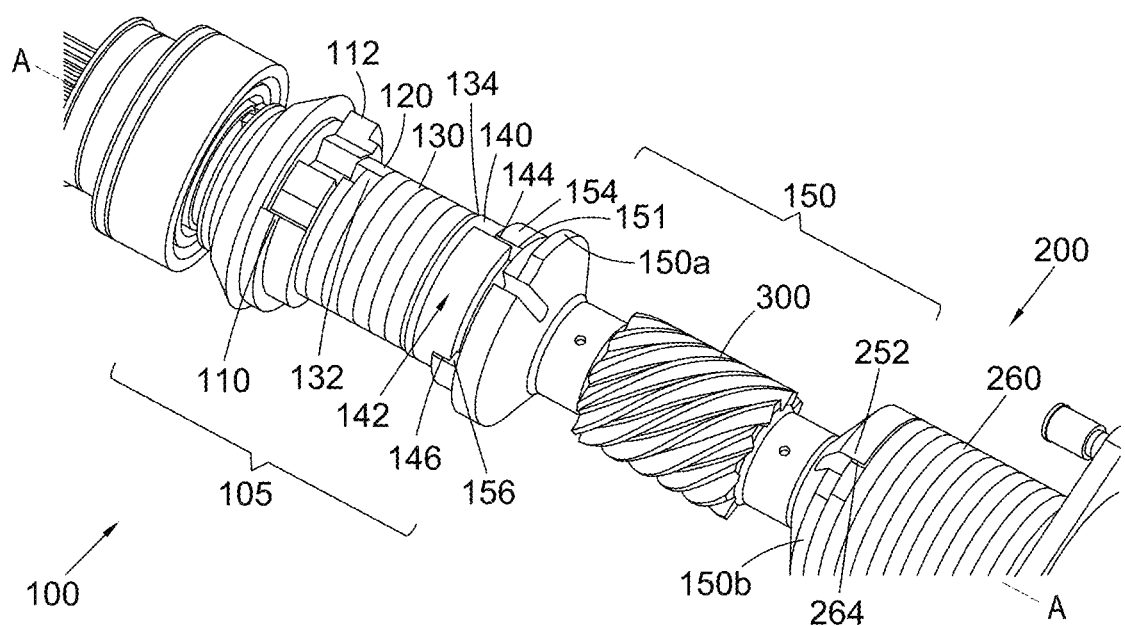
FIG. 1 shows a perspective partial view of a torque limiter and no-back assembly.

In known torque limiters it can be difficult to correctly set the threshold torque at which braking occurs to protect downstream parts of the actuator from overloads, while preventing nuisance (unwanted) activations of the torque limiter under normal operating conditions. The torque limiter activation setting must take into account the possible variations of efficiency and drag torques of internal components of the actuator, which are mainly due to the ambient temperature at which the actuator operates (lower temperatures result in lower overall efficiency). In addition, the load/torque rate on the output, which depends on the structural stiffness, could have an influence on the torque limiter trip value (activation setting), i.e. the level of torque at which the torque transmission path is interrupted by operable disengagement of the input and output shafts. These effects can cause the difference between the minimum and maximum torque limiter activation threshold to be quite high. The actuator design should therefore take that threshold variation into account for sizing all its internal components. Reducing the difference between the minimum and maximum torque limiter activation thresholds can reduce the overall dimensions of the actuator, thereby saving weight.

Broadly speaking, torque limiter and no-back assemblies comprise a no-back device which is activated by a torque sensing element of the assembly. In a known arrangement, the torque sensing element comprises a spring biased torque coupling comprising a sliding collar provided with helical ramps which engage similar shaped ramps on an output shaft.

The behaviour and performance of such prior art torque limiters depend mainly on two major sliding friction contributions, namely between helical ramps provided on the sliding collar and the free (output) shaft; and between a spline coupling of the sliding collar and the input shaft.

The coefficients of friction between these two pairs of components were the main contributors to the threshold between the minimum and maximum torque-limiter engagement, and contribute greatly to the output stiffness dependency.

However, in the present disclosure, the sliding friction contributions have both been replaced by using a torque sensitive element which comprises a torsion spring, as will be described in more detail below, thereby eliminating the variation and inconsistencies provided by such contributions.

By providing a torsion spring to transmit torque along the torque path between the input shaft and the sliding collar, the effect of friction between a sliding collar and the input shaft is avoided. This is beneficial as is makes the torque limiter comparatively insensitive (or much less sensitive) to external load/torque rate. Having a tighter threshold between the minimum and maximum torque-limiter engagement across the full temperature range highly reduces the risk of nuisance trips of the torque-limiter during the life of an actuator, which may be caused by efficiency variations. This may also have a positive impact (mainly weight reduction) on actuator parts sizing, since the torque limiter and no-back assembly can be designed more precisely to operate at a given (lower) threshold of torque.

The concept of using a torque sensitive element which comprises a torsion spring can be easily applied to existing torque-limiter and no-back assembly designs, for example, with the simple replacement of a few internal components.

Significant performance improvements can also result by sensing torque directly through an elastic element in the form of a torsion spring instead of relying on contact between sensing elements which are subject to friction. For example, the assembly can be configured to sense torque between the input shaft and the output shaft as soon as there is relative rotation between them.

Figure 3:
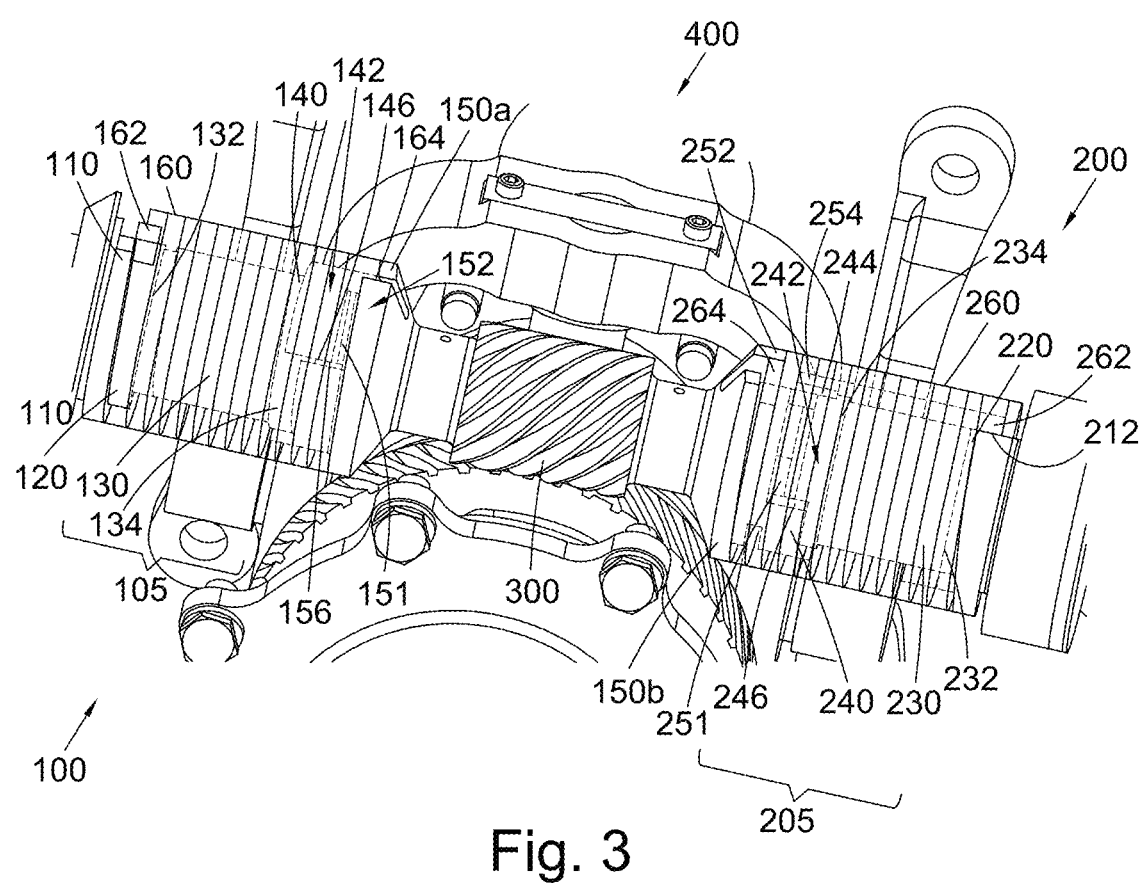
FIG. 3 shows a perspective view of a torque limiter and no-back assembly within an actuator assembly, with the torque-limiter visible through the no-back springs.
Figure 6:
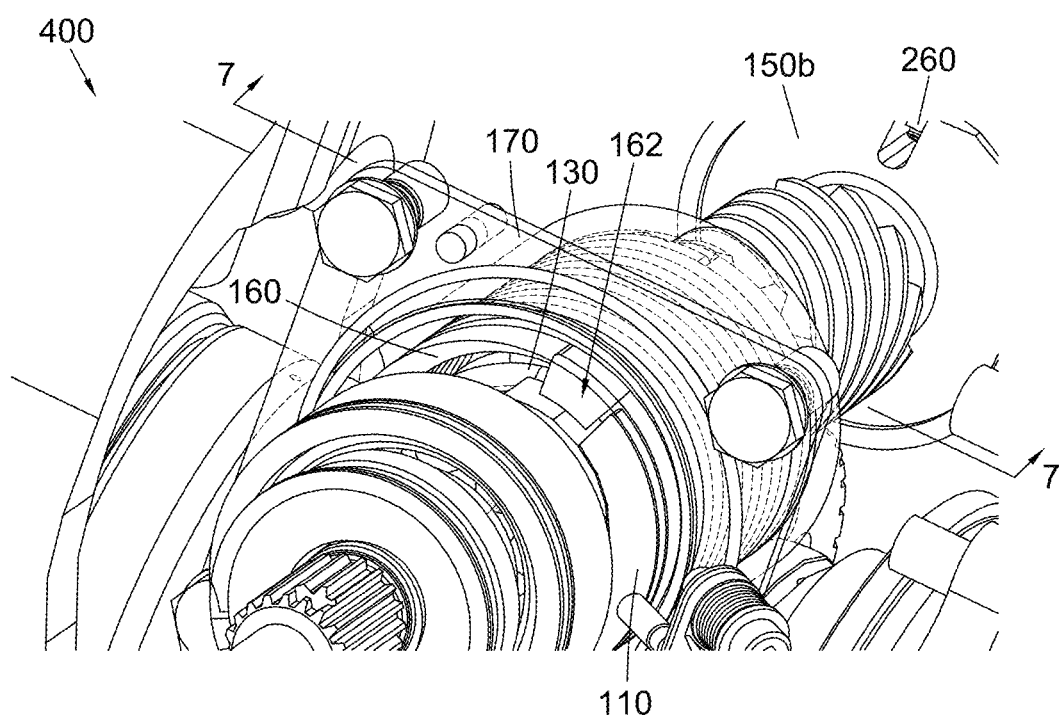
FIG. 6 shows a perspective partial view of a torque limiter and no-back assembly along an input shaft towards the output shaft.

In more detail now, and with reference to FIGS. 1 and 3, an exemplary torque limiter and no-back assembly is shown which comprises a first sub-assembly 100, a second sub-assembly 200 and an output shaft 150 with a worm gear 300. Each of the sub-assemblies 100, 200 are set within a housing (see FIG. 6 showing housing 170 for the first sub-assembly 100; a similar housing, not shown, is provided for the second sub-assembly 200).

With reference to FIG. 1, the first sub-assembly 100 comprises an input shaft 110, a torque limiter 105 comprising a torsion sensing element in the form of a torsion spring 130 and a first end 150a of the output shaft 150 arranged about an Axis A-A. A first end 132 of the torsion spring 130 is fixed to a first support 120 of the torque limiter 105, which in turn is fixed to the input shaft 110 for rotation therewith. A second end 134 of the torque sensing element 130 is fixed to a second support 140 of the torque limiter 105, which is part of a displaceable torque coupling linking the torque sensing element 130 to the first end 150a of the output shaft 150. The second support 140 comprises a tooth 142 protruding in the axial direction A-A which slots into a recess 151 of the first end 150a of the output shaft 150. Tooth 142 has side surfaces 144, 146 which are parallel to the axial direction A-A, and which are arranged to engage with corresponding side surfaces 154, 156 of the recess 151 of the first end 150a of the output shaft 150, which side surfaces 154, 156 are also parallel to the axial direction A-A.

In this way, by coupling both ends of the torque sensing element to the input and output shafts 110, 150 respectively, relative rotation of the input shaft 110 in a given direction, e.g. in an anticlockwise direction with respect to the output shaft 150 (as viewed from the output shaft 150 looking along the Axis A-A towards the input shaft 110), causes the torsion spring 130 to twist open elastically and undergo torsion, expanding each of its coils in a radial direction. This anticlockwise direction may correspond with one of extension or retraction of an actuator 400. The torsion spring 130 therefore provides an elastic coupling between the input shaft 110 and the output shaft 150 that "senses" the torque in this operative direction. The torque sensing element 130 also transmits torque between the two shafts 110, 150, since it is always coupled for rotation at both ends with the respective shafts 110, 150. When torque is applied in the other direction, the torsion spring 130 may provide a more rigid coupling as a result of the shape of the coils. To sense torque in this other direction, a second torque sensing element 230 may be provided, as will be explained below.

The spring rate of the torque sensing element 130 in its operative direction is chosen to provide a controlled amount of rotation of the input shaft 110 before the torque limiter 105 is "activated". In this way, a predetermined limit or threshold level of torque for activation of the torque limiter can be pre-set into the torque sensing element 130 and the operation of the sub-assembly 100. A threshold level of torque may be set for one or both of extension or retraction of the actuator 400.

Figure 4:
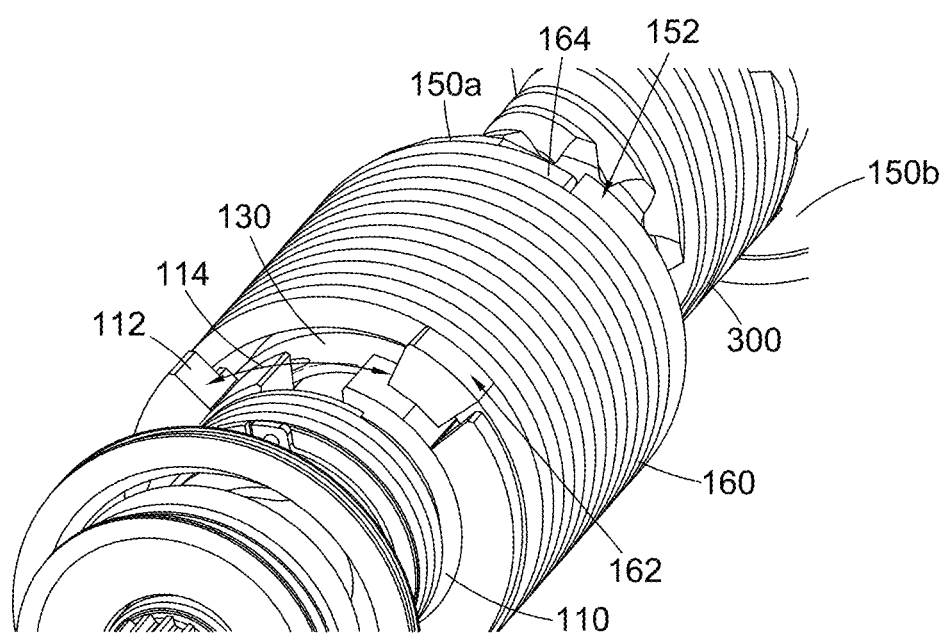
FIG. 4 shows a perspective partial view of a torque limiter and no-back assembly along an input shaft towards the output shaft.

With reference to FIG. 3, the first sub-assembly 100 further includes a no-back device with a no-back spring 160 having a first end 162 and a second end 164. The second end 164 is engaged with a tooth 152 (see FIGS. 1 and 4) of the first end 150a of the output shaft 150, while the first end 162 is arranged to engage with a tooth 112 (see FIGS. 1 and 4) of the input shaft 110 for the input of torque, after a predetermined amount of relative rotation has occurred between the input shaft 110 and the output shaft 150. This predetermined amount of rotation can be set so that the no-back spring 160 operates to brake the output shaft 150 and ground torque to a housing 170 when levels of torque in excess of the threshold level are experienced by the sub-assembly 100.

The no-back spring 160 is a form of torsion spring having a torsional stiffness which is less than that of the torque sensing element 130, and may be significantly so. For example, the torsional stiffness of the no-back spring 160 may be less than 10% of the torsional stiffness of the torque sensing element 130. For example, the no-back spring 160 may comprise a greater number of coils, thinner coils or be made of a more flexible material than the torque sensing element 130.

With continued reference to FIG. 3, the second sub-assembly 200 is generally symmetrical with the first sub-assembly 100 about a plane located at the worm gear 300 having a normal parallel to the axis A-A. Second sub-assembly 200 comprises an input shaft 210, a second torque limiter 205 comprising a second torque sensing element 230 in the form of a torsion spring, and a second end 150b of the output shaft 150, opposite to the first end 150a of the output shaft 150 arranged about Axis A-A. The arrangement is similar to the first sub-assembly 100 and operates in a similar way, except that is configured to sense and respond to torque in the other direction. Thus, if the first sub-assembly 100 senses the torque in an extension direction of the actuator 400, i.e. in one of a clockwise and anticlockwise direction, then the second sub-assembly 200 senses the torque in a retraction direction of the actuator 400, i.e. in the other of a clockwise and anticlockwise direction, and vice versa.

A first end 232 of the second torque sensing element 230 is fixed to a first support 220 of the torque limiter 205. The first support 220 is in turn fixed to the input shaft 210 for rotation therewith. A second end 234 of the second torque sensing element 230 is fixed to a second support 240 of the torque limiter 205 of the second sub-assembly 200. The second support 240, which is part of a displaceable torque coupling linking the second torque sensing element 230 to the second end 150b of the output shaft 150, comprises a tooth 242 protruding in the axial direction A-A which slots into a recess 251 of the second end 150b of the output shaft 150. Tooth 242 has side surfaces 244, 246 which are parallel to the axial direction A-A, and which are arranged to engage with corresponding side surfaces 254, 256 of the recess 251 of the second end 150b of the output shaft 252, which side surfaces 254, 256 are also parallel to the axial direction A-A. While the displaceable torque coupling allows axial movement of the second end 234 of the second torque sensing element 230 in response to torsion of the second torque sensing element 230, these side surfaces 244, 246, 254, 256 stay coupled to transmit torque at all times.

In this way, by coupling both ends of the torque sensing element to the input and output shafts 210, 150 respectively, relative rotation of the input shaft 210 in a given direction, e.g. in a clockwise direction with respect to the output shaft 150 (as viewed from the input shaft 210 looking along the Axis A-A towards the output shaft 150), causes the second torque sensing element 230 to twist open elastically and undergo torsion, expanding each of its coils in a radial direction. This clockwise direction may correspond with one of extension or retraction of an actuator 400. The second torque sensing element 230 therefore provides an elastic coupling between the input shaft 210 and the output shaft 150 that "senses" the torque in this operative direction. The second torque sensing element 230 also transmits torque between the two shafts 210, 150, since it is always coupled for rotation at both ends with the respective shafts 210, 150. When torque is applied in the other direction, the second torque sensing element 230 may provide a more rigid coupling as a result of the shape of the coils. To sense torque in this other direction, the first torque sensing element 130 may be provided, as described above.

The spring rate of the second torque sensing element 230 in its operative direction is chosen to provide a controlled amount of rotation of the input shaft 210 (or output shaft 150) before the torque limiter 205 is "activated". In this way, a predetermined limit or threshold level of torque for activation of the torque limiter can be pre-set into the second torque sensing element 230 and the operation of the second sub-assembly 200. A threshold level of torque may be set for one or both of extension or retraction of the actuator 400.

As with the first sub-assembly 100, torque applied at either end of the second sub-assembly 200 causing rotation of the input shaft 210 relative to the output shaft 150 is sensed by the second torque sensing element 230, at least in one direction, though an elastic response in the torsion spring body of the second torque sensing element 230. This part also serves to transmit torque between the input shaft 210 and the output shaft 150 in a similar way to the first torque sensing element 130.

With reference to FIG. 1, the second sub-assembly 200 further includes a second no-back device with a no-back spring 260 having a first end 262 and a second end 264. The second end 264 is engaged with a tooth 252 (see FIG. 3) of the second end 150b of the output shaft 150, while the first end 262 is arranged to engage with a tooth 212 of the input shaft 210 for the input of torque, after a predetermined amount of relative rotation has occurred between the input shaft 210 and the output shaft 150. This predetermined amount of rotation can be set so that the second no-back spring 260 operates to brake the output shaft 150 and ground torque to a housing (not shown, but similar to housing 170 which is provided for sub-assembly 100 as shown in FIG. 6) when levels of torque in excess of the threshold level are experienced by the second sub-assembly 200.

The no-back spring 260 of the second no-back device is in the form of a torsion spring having a torsional stiffness which is less than that of the second torque sensing element 230, and may be significantly so. For example, the torsional stiffness of the no-back spring 260 may be less than 10%. For example, the second no-back spring 260 may comprise a greater number of coils, thinner coils or be made of a more flexible material than the second torque sensing element 230.

The first sub-assembly 100 and the second sub-assembly 200 are connected via the output shaft 150 which comprises gearing for transmitting drive to an actuator 400. In the exemplary embodiment of FIG. 3, the gearing is in the form of a worm gear 300 positioned in-between the first and second sub-assemblies 100, 200, though other arrangements are also envisaged.

In use, when a torque below a threshold level is applied at the input shaft 110 of the first sub-assembly 100, for example, to drive the actuator 400, the torque is transmitted via the first support 120 into the first torque sensing element 130 through its engagement with the first end 132 of the first torque sensing element 130. The torque sensing element 130 is relatively stiff so that in the absence of significant load on the output shaft 150 resisting the input torque, the torque is transmitted to the output shaft 150 and worm gear 300 to drive the actuator 400. Any load present in the first sub-assembly 100 is "sensed" by the torque sensing element 130 through it undergoing torsion and the coils of the torsion spring body expanding radially in an elastic manner according to its spring rate.

Figure 5:
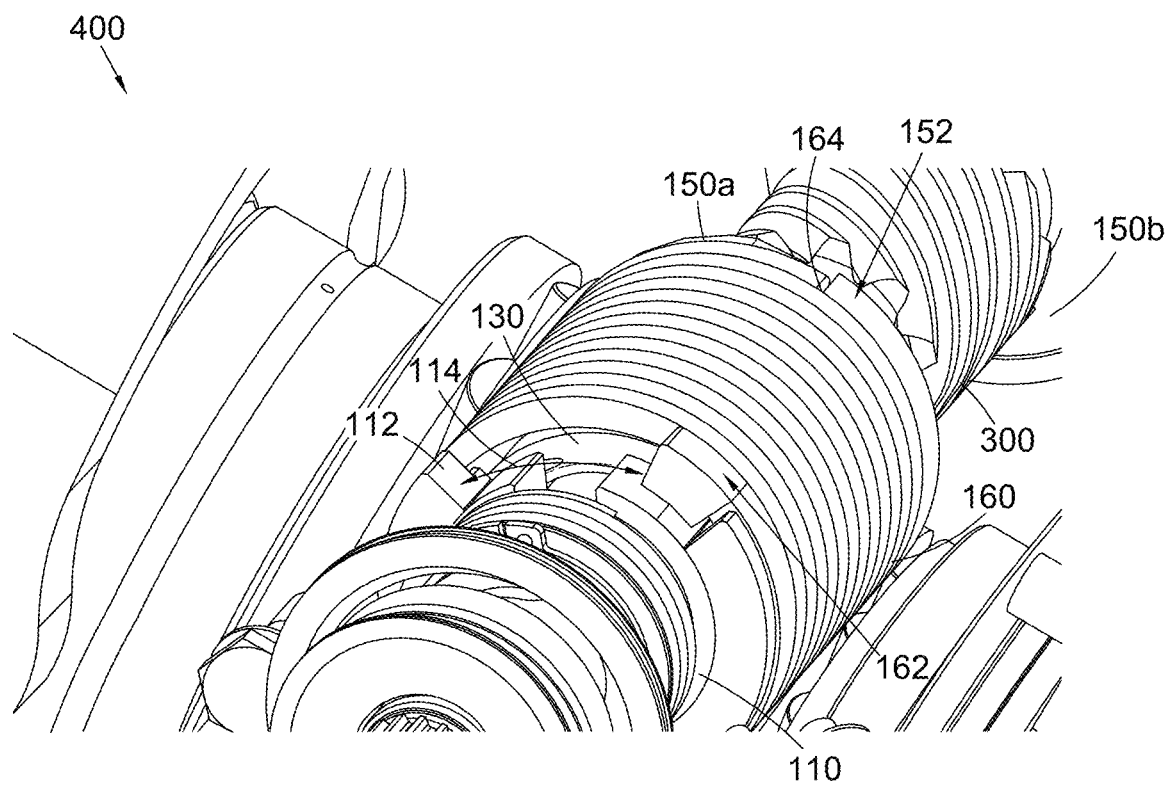
FIG. 5 shows the perspective partial view of FIG. 4 fitted within an actuator assembly.

The torque sensing element 130 transmits torque to the second support 140 through its second end 134. The engaging side surface 144 of the second support 140 abuts and pushes against the side surface 154 of the recess 151 of the first end 150a of the output shaft 150. The torque sensing element 130 expands radially by a small amount, while the output shaft 150 similarly is rotated by a small amount. The greater the input torque, the more the relative rotation between the input shaft 110 and the output shaft 150 increases, and the more a circumferential gap 114 (see FIGS. 5, 6 and 7A) between the first end 162 of the no-back spring 160 and the tooth 112 of the input shaft 110 closes.

When a torque at the threshold level (or just below, to account for take-up in the no-back spring 160) is applied at the input shaft 110 of the first sub-assembly 100, the circumferential gap 114 (see FIGS. 5, 6 and 7A) between the first end 162 of the no-back spring 160 and the tooth 112 of the input shaft is closed. At this point (see FIG. 7B), the first end 162 of the no-back spring 160 and the tooth 112 of the input shaft 110 are in contact. Further rotation of the input shaft 110 would start to transfer torque into the no back spring 160 through this contact.

Thus, when a torque above the threshold level is applied at the input shaft 110 of the first sub-assembly 100, the no-back spring 160 reacts some of the applied torque by expanding radially. FIGS. 7A, 7B and 7C depict a cross-sectional view along the line 7-7 in FIG. 6, but showing only the no-back spring 160, a part of the input shaft 110 and the housing 170 which surrounds the no-back spring. In FIG. 7A, the no-back spring 160 is at rest and it is installed inside the sleeve 170 with a small interference (e.g., about 0.5 Nm). There is a circumferential gap between the tooth 112 of the input shaft 110 and the first end 162 of the no-back spring 160. When torque is applied to the input shaft, it begins to rotate in the direction indicated by the arrow E, which causes the gap 114 to start to close. FIG. 7B shows the point at which the gap 114 is closed, such that the tooth 112 of the input shaft 110 contacts the first end 162 of the no-back spring 160. As further torque is applied to the input shaft, it rotates further in the direction E, such that the first end 162 of the no-back spring 160 is also forced to rotate in the direction E, pushed by the tooth 112 of the input shaft 110. This causes the no-back spring 160 to expand radially. However, since the no-back spring 160 is surrounded by the housing 170, it can only expand as far as the seat in the housing 170 before being unable to expand further, since the outer circumferential surface of the no-back spring 160 contacts and abuts the inner circumferential surface, or "seat" of the housing 170. The limitation on radial expansion of the no-back spring 160 provides a braking force which reacts all further applied torque and prevents further rotation of the output shaft 150 under the high torque conditions. In this way, excessive levels of torque are grounded into the housing 170 rather than being transmitted to downstream components.

Similarly, in use, when a torque below a threshold level is applied at the input shaft 210 of the second sub-assembly 200, that torque is transmitted via the first support 220 into the second torque sensing element 230 through its engagement with the first end 232 of the second torque sensing element 230. The second end 234 of the second torque sensing element 230 carries the torque to the second support 240. The engaging side surface 246 of the second support 240 abuts and pushes against the side surface 256 of the recess 251 of the second end 150b of the output shaft 150. The torsion spring body of the second torque sensing element 230 expands radially by a small amount, while the output shaft 150 similarly is rotated by a small amount. The greater the input torque, the more the output shaft rotates, and the more a circumferential gap (not shown, but similar to gap 114 shown in FIGS. 5, 6 and 7A) between the second end 264 of the no-back spring 260 and the tooth 252 of the second end 150b of the output shaft 150 closes.

When a torque at the threshold level (or just below, to account for take-up in the no-back spring 260) is applied at the input shaft 210 of the second sub-assembly 200, the gap (not shown, but similar to gap 114 shown in FIGS. 5, 6 and 7A) between the first end 262 of the no-back spring 260 and the tooth 212 of the input shaft 210 is closed. At this point, the first end 262 of the no-back spring 260 and the tooth 212 of the input shaft 210 are in contact. Further rotation of the input shaft 210 would start to transfer torque into the no back spring 260 through this contact.

The same description above with reference to FIGS. 7A, 7B and 7C is applicable to the no-back spring 260, input shaft 210 and housing of the second sub-assembly 200. Thus, when a torque above the threshold level is applied at the input shaft 210 of the second sub-assembly 200, the no-back spring 260 reacts some of the applied torque by expanding radially. However, since the no-back spring 260 is surrounded by a housing (not shown, but similar to housing 170 shown in FIGS. 6, 7A, 7B and 7C), it can only expand as far as the seat in the housing before being unable to expand further. The limitation on radial expansion of the no-back spring 260 provides a braking force which reacts all further applied torque and prevents further rotation of the output shaft 150 under the high torque conditions. In this way, excessive levels of torque are grounded into the housing rather than being transmitted to downstream components.

Figure 2:
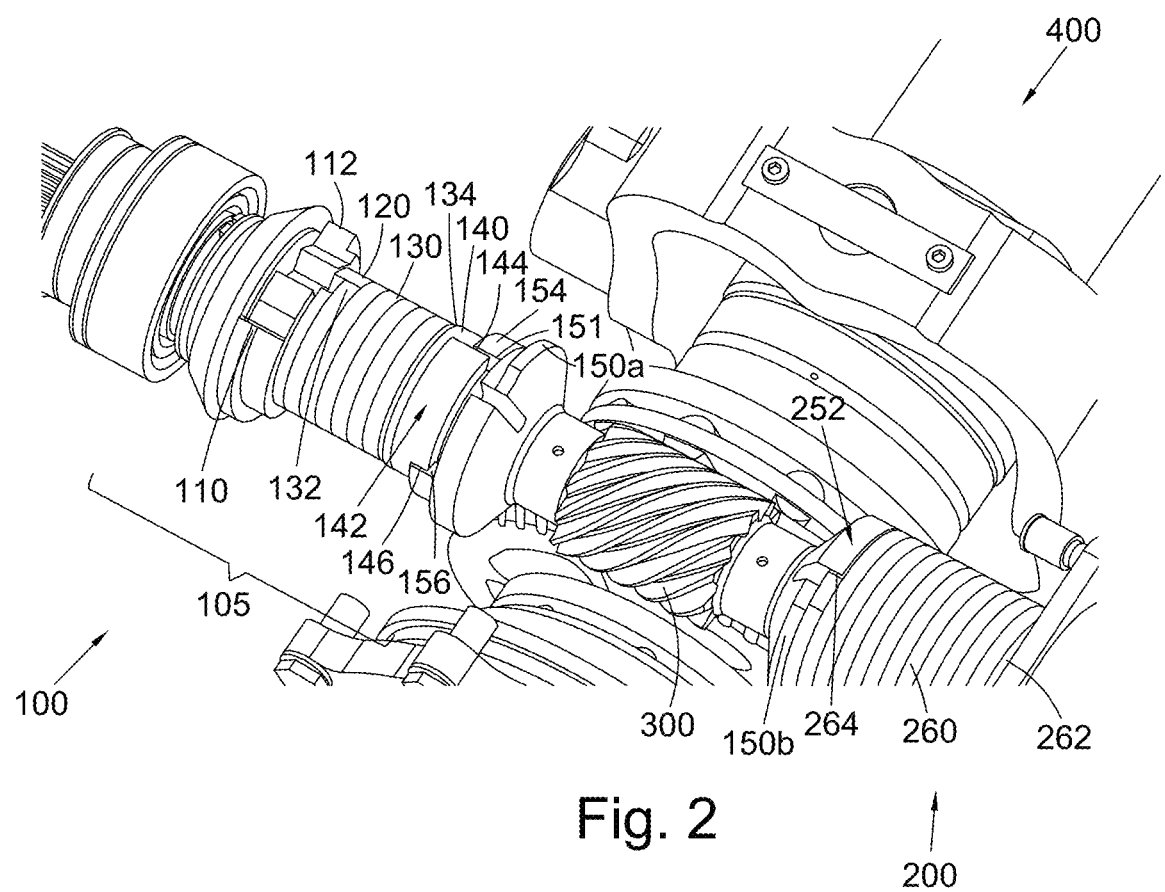
FIG. 2 shows the perspective partial view of FIG. 1 fitted within an actuator assembly.

Although the above description of usage refers to resisting and braking a torque above a threshold applied from the input shaft 110, 210 to the output shaft 150, the converse is true. The worm gear 300 may interact directly with gearing of an actuator 400, and may receive external loads from the components that the actuator 400 is connected to. For example, the actuator 400 may be a ballscrew type actuator as illustrated in FIGS. 2 and 3, and this may be connected to a flight control surface (not shown) and coupled back to the torque limiter and no-back assembly through the worm gear 300 engaging with a worm wheel installed on a nut of the ballscrew. The actuator 400 may thus transmit external loads from these flight control surface components back into the torque limiter and no-back assembly and these may be tension or compression loads. As a result, external loads applied to the ballscrew are transferred to the output shaft 150 through the worm wheel, and can cause clockwise or anti-clockwise rotation of the output shaft 150 (and, as a consequence, rotation of the input shaft 110, 210) unless a no-back device is provided. The two no-back springs 160, 260 act to prevent such clockwise and anti-clockwise rotation, respectively, of the output shaft 150 as a result of excessive external loads.

Thus, a braking function against excessive external loads is also provided by the no-back springs 160, 260. Initially, depending on the direction of the torque, one of the torque sensing elements 130, 230 will resist the external torque below the threshold level while expanding and the output shaft 150 rotates until both of the torque input surfaces, i.e., teeth 112, 152, 212, 252, contact the respective ends 162, 164, 262, 264 of the no-back spring 160, 260 arranged to brake applied torque in that direction of rotation. If torque applied to the output shaft 150 and transmitted to the input shaft 110, 210 increases past this threshold level, then the coils of one of the two no-back springs 160, 260 (depending on the rotational direction of the torque from the external load, i.e. clockwise or anti-clockwise) are enlarged by radial expansion in their seat in the housing (170 for the first sub-assembly 100 and similar housing for the second sub-assembly 200) and lock with the housing 170 by being constrained by the housing 170, so preventing the torque being transmitted back to the input shaft 110, 210.

Thus, when the input torque exceeds a certain threshold, the input torque is grounded to the housing 170 through one of the no-back springs 160, 260, depending on the direction of rotation of the input torque.

Once the spring 160 or 260 is locked inside its seat in the housing 170 in this way, the only way to unlock the expanded no-back spring 160 or 260, to allow transmission of torque again between the input and output shaft, is if the external applied load decreases below the torque limiting threshold.

As discussed above and shown in FIG. 3, there are two no-back springs 160 and 260. One of the no-back springs 160, 260 brakes (locks) when an external load acts in compression and the other one of the no-back springs 160, 260 brakes (locks) when the external loads acts in tension. The no-back spring 160 performs the no-back function of preventing the input shaft 110, 210 from rotating in an anticlockwise direction with respect to the output shaft 150 (as viewed from the output shaft 150 looking along the Axis A-A towards the input shaft 110). This anticlockwise direction may correspond with one of extension or retraction of an actuator 400. The other no-back spring 260 prevents the input shaft 110, 210 from rotating in a clockwise direction when viewed along input shaft 110 away from the worm gear 300, under excessive external loads.

When they are released, the no-back springs 160, 260 rotate with minimum drag torque. When they are activated, the no-back springs 160, 260 develop a very large braking torque ($T_B$), which is a linear function of its preload torque ($T_0$), caused by the interference of the no-back springs 160, 260 in the housing 170, and an exponential function of the number of coils (N) and of the friction factor (f) of the spring, as defined by:

$$T_B = T_0 e^{2\pi Nf}$$

In the embodiments shown, all of the components of the assembly described may be made of a suitable steel. The housing, and in particular the seat which receives the no-back spring, may be made of surface hardened steel, though of course other materials may alternatively be used. The body of the actuator may be made of a lighter weight material such as aluminium; however other materials may alternatively be used.

At least one of the no-back springs and/or at least one of the torque sensing elements may comprise coils having a rectangular cross-section.

The present disclosure may be implemented in linear or rotational mechanical actuators for example.

The present disclosure may be implemented in aircraft, e.g. in aircraft actuation systems such as those for aircraft wing flaps and/or slats.

The torque sensing elements 130, 230 may comprise regular torsion springs comprising wound spring strip similar to those of the no back devices, albeit having a different spring rate. Alternatively, the torque sensing elements 130, 230 may be formed by a 3-D printing technique and constructed with integral supports 120, 140, 220, 240 engaging with appropriate formations of the input and output shafts 110, 210, 150.

The invention claimed is:

1. A torque limiter and no-back assembly comprising:
an input shaft;
an output shaft;
a torque limiter provided between the input shaft and the output shaft, the torque limiter comprising a torque sensing element; and
a no-back device arranged to brake the output shaft when the torque sensing element senses levels of torque above a threshold level between the input shaft and the output shaft;
wherein the torque sensing element comprises a torsion spring having ends which are coupled to the input shaft and the output shaft for rotation therewith, and
wherein the torque sensing element is also arranged to transmit torque between the input shaft and the output shaft through a displaceable torque coupling allowing axial movement of one end of the torque sensing element.

2. The torque limiter and no-back assembly as claimed in claim 1, wherein the torque sensing element senses torque by undergoing torsion, the torsion in the torque sensing element allowing a predetermined amount of relative rotation between the input shaft and the output shaft prior to activation of the no-back device to brake the output shaft.

3. The torque limiter and no-back assembly as claimed in claim 1, wherein the displaceable torque coupling is positioned between the torque sensing element and the output shaft.

4. The torque limiter and no-back assembly as claimed in claim 1, wherein the torque limiter comprises at least one support at one or each end for coupling rotation from the input shaft and the output shaft into a respective end of the torque sensing element.

5. The torque limiter and no-back assembly as claimed in claim 1, wherein the no-back device is provided between the input shaft and the output shaft in parallel with the torque limiter, the no-back device being arranged to activate a brake to ground torque to a housing if torque has exceeded the threshold level.

6. A torque limiter and no-back assembly comprising:
an input shaft;
an output shaft;
a torque limiter provided between the input shaft and the output shaft, the torque limiter comprising a torque sensing element; and
a no-back device arranged to brake the output shaft when the torque sensing element senses levels of torque above a threshold level between the input shaft and the output shaft;
wherein the torque sensing element comprises a torsion spring having ends which are coupled to the input shaft and the output shaft for rotation therewith;
wherein the no-back device comprises a no-back spring arranged within a housing, the no-back spring being a torsion spring which expands radially under torque to engage a seat provided by the housing.

7. The torque limiter and no-back assembly as claimed in claim 6, wherein the no-back spring has the same winding direction as the torque sensing element and wherein the torque sensing element extends within the no-back spring.

8. The torque limiter and no-back assembly as claimed in claim 6, wherein the no-back spring comprises ends, one of which is allowed to rotate relative to one of the input shaft or the output shaft when torque is not being transmitted by the no-back spring.

9. The torque limiter and no-back assembly as claimed in claim 8, wherein a second end of the no-back spring is fixed to the output shaft by mechanical engagement with a groove.

10. The torque limiter and no-back assembly as claimed in claim 7, wherein the torque limiter further comprises input surfaces at one or both of the input shaft and/or the output shaft to couple torque into the no-back device, wherein one or more of the input surfaces is rotationally spaced from an adjacent end of the no-back spring when torque is absent from the assembly.

11. The torque limiter and no-back assembly as claimed in claim 8, wherein the torque input surfaces comprise teeth which engage the ends of the no-back spring, and wherein both ends of the no-back spring are arranged to be in engagement with respective adjacent teeth once a predetermined amount of relative rotation has occurred between the input shaft and the output shaft.

12. The torque limiter and no-back assembly as claimed in claim 6, wherein the torque sensing element is stiffer under torsion than the no-back spring, and preferably wherein the torque sensing element comprises a smaller number of coils than the no-back spring, or comprises a torsion spring having thicker coils, and/or is formed from a material having a greater modulus of elasticity than the no-back spring.

13. The torque limiter and no-back assembly as claimed in claim 4, wherein the assembly comprises a second torque sensing element arranged on an opposite end of the output shaft to sense torque in an opposite direction of rotation to the other, first torque sensing element.

14. The torque limiter and no-back assembly as claimed in claim 13, wherein the assembly comprises a second no-back device which is arranged to brake the output shaft when the second torque sensing element senses levels of torque above a threshold level between the input shaft and the output shaft in the opposite direction.

15. The torque limiter and no-back assembly as claimed in claim 14, wherein the second no-back device comprises a second no-back spring arranged within a second housing, the second no-back spring being a torsion spring which expands radially under torque to engage a seat provided by the second housing.

16. The torque limiter and no-back assembly as claimed in claim 15, the second no-back spring has the same winding direction as the second torque sensing element, and/or wherein the second torque sensing element extends within the second no-back spring.

17. The torque limiter and no back assembly as claimed in claim 14, wherein the output shaft comprises a worm gear for engagement with an actuator, the worm gear being located between the two torque sensing elements and between the two no-back springs.

18. An actuator for a flight control surface comprising the torque limiter and no-back assembly of claim 1.

19. A method of sensing torque in a torque limiter and no-back assembly, the assembly comprising an input shaft, an output shaft, a torque limiter provided between the input shaft and the output shaft, the torque limiter comprising a torque sensing element, and a no-back device arranged to brake the output shaft when the torque sensing element senses levels of torque above a threshold level between the input shaft and the output shaft, wherein the method uses a torsion spring for the torque sensing element which has ends coupled to the input shaft and the output shaft for rotation therewith, such that torque is sensed through torsion of the torque sensing element, wherein the torque sensing element is also arranged to transmit torque between the input shaft and the output shaft through a displaceable torque coupling allowing axial movement of one end of the torque sensing element.

20. The method of sensing and transmitting torque as claimed in claim 19, wherein the assembly comprises a second torque sensing element in the form of a second torsion spring arranged on an opposite end of the output shaft, the second torsion spring being arranged to sense torque in an opposite direction to the first torque sensing element.

* * * * *